United States Patent
Zhang et al.

(10) Patent No.: US 8,532,011 B2
(45) Date of Patent: Sep. 10, 2013

(54) METHOD AND APPARATUS FOR TRANSMITTING MULTIPLE MULTICAST COMMUNICATIONS OVER A WIRELESS COMMUNICATION NETWORK

(75) Inventors: Zinping Zhang, San Diego, CA (US); Harleen Gill, San Diego, CA (US); Arul Ananthanarayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1078 days.

(21) Appl. No.: 11/963,024

(22) Filed: Dec. 21, 2007

(65) Prior Publication Data

US 2009/0080353 A1 Mar. 26, 2009

Related U.S. Application Data

(60) Provisional application No. 60/974,844, filed on Sep. 24, 2007.

(51) Int. Cl.
*H04H 20/71* (2008.01)
*H04W 4/00* (2009.01)
*H04W 72/00* (2009.01)
*H04L 12/28* (2006.01)

(52) U.S. Cl.
USPC ........... 370/312; 370/328; 370/329; 370/338; 370/390; 455/422.1; 455/450

(58) Field of Classification Search
USPC ....................................................... 370/312
See application file for complete search history.

(56) References Cited

U.S. PATENT DOCUMENTS

| | | | |
|---|---|---|---|
| 5,930,248 A * | 7/1999 | Langlet et al. | 370/347 |
| 6,327,254 B1 * | 12/2001 | Chuah | 370/328 |
| 2002/0051455 A1 * | 5/2002 | Lee et al. | 370/395.21 |
| 2003/0211859 A1 | 11/2003 | Chen et al. | |
| 2005/0186973 A1 * | 8/2005 | Gaal et al. | 455/458 |
| 2005/0243751 A1 * | 11/2005 | Yoon et al. | 370/312 |
| 2006/0025125 A1 * | 2/2006 | Hong et al. | 455/422.1 |
| 2007/0019645 A1 * | 1/2007 | Menon | 370/390 |
| 2007/0220573 A1 | 9/2007 | Chiussi et al. | |

FOREIGN PATENT DOCUMENTS

| | | |
|---|---|---|
| JP | 2005525060 A | 8/2005 |
| JP | 2005530463 A | 10/2005 |
| JP | 2008522510 A | 6/2008 |
| WO | WO03103320 A1 | 12/2003 |
| WO | 2006110322 | 10/2006 |
| WO | WO2007089446 A1 | 8/2007 |

OTHER PUBLICATIONS

International Preliminary Report on Patentability, PCT/US2008/077540, International Bureau, The International Bureau of WIPO, Apr. 1, 2010.

(Continued)

*Primary Examiner* — Ian N Moore
*Assistant Examiner* — Jenee Alexander
(74) *Attorney, Agent, or Firm* — Raphael Freiwirth (57) ABSTRACT

Apparatus and method for allocating bandwidth for multicast communications in a wireless communication network. The base station allocates certain bandwidth for handling multicast communications through a multicast communication channel. When a new multicast communication arrives, the base station assigns a predefined number of bandwidth to the multicast communication channel according to a predefined algorithm. A wireless device will monitor all slots in a multicast channel and discard all the packets not belonging to its call.

36 Claims, 5 Drawing Sheets

(56) References Cited

OTHER PUBLICATIONS

International Search Report, PCT/US2008/077540, International Searching Authority, European Patent Office, Feb. 2, 2009.

Written Opinion, PCT/US2008/077540, International Searching Authority, European Patent Office, Feb. 2, 2009.

European Search Report—EP08103006—Search Authority—Munich—Jan. 26, 2009.

* cited by examiner

METHOD AND APPARATUS FOR TRANSMITTING MULTIPLE MULTICAST COMMUNICATIONS OVER A WIRELESS COMMUNICATION NETWORK

BACKGROUND OF THE INVENTION

1. Field of the Invention

The invention relates to communications in a wireless telecommunication system and, more particularly, multiple multicast communications in a wireless telecommunication system.

2. Description of the Related Art

In wireless telecommunication systems, Push-to-talk (PTT) capabilities are becoming popular with service sectors and consumers. PTT can support a "dispatch" voice service that operates over standard commercial wireless infrastructures, such as code division multiple access (CDMA), frequency division multiple access (FDMA), time division multiple access (TDMA), and global system for mobile communications (GSM). In a dispatch model, communication between endpoints (end user devices) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification. In the absence of a wireless multicast channel, each group is formed by the combination of separate point-to-point connections between each endpoint and PTT servers manage the call. Each endpoint is also known as a client. Alternatively, when a group is reduced to two members and a PTT call is from one member to another, the PTT call would be a direct call between these two members.

Figure 1:
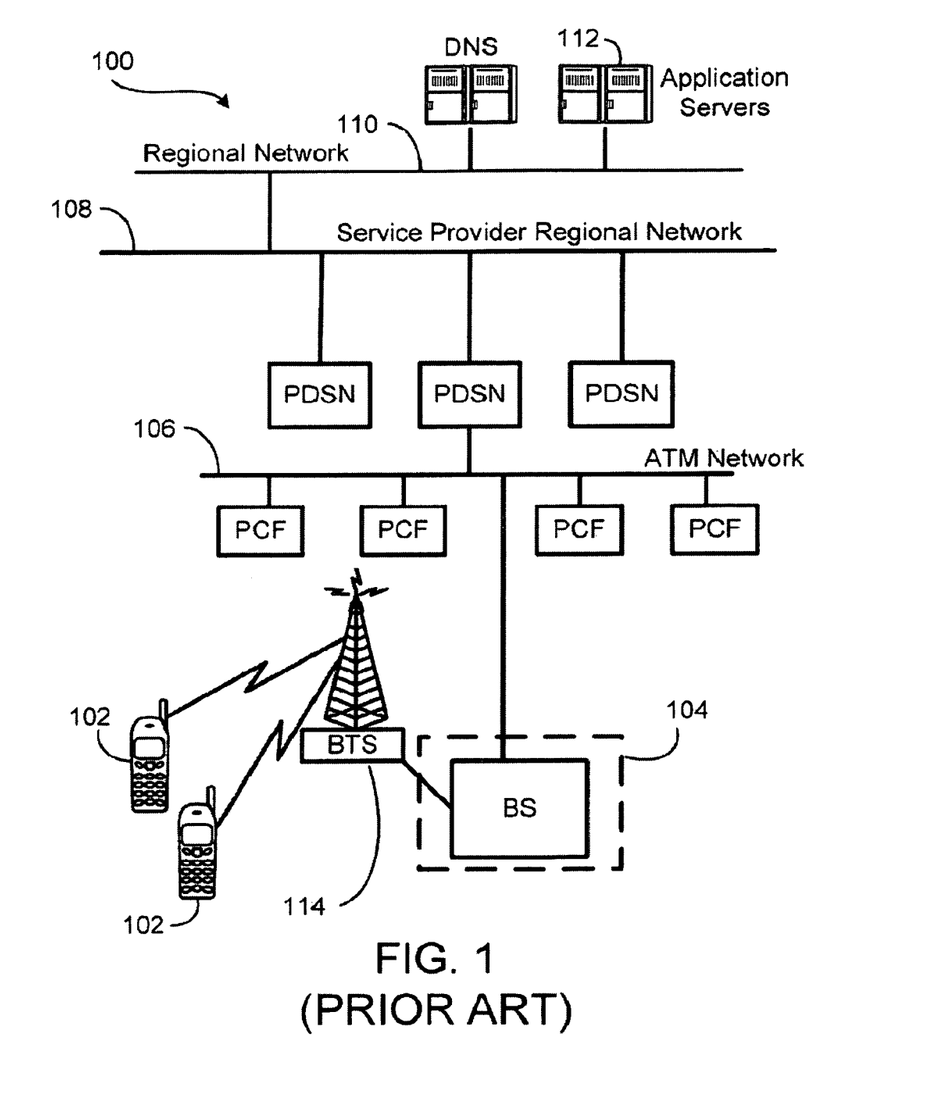
FIG. 1 is a prior art architecture of a wireless communication network.

FIG. 1 illustrates a prior art architecture 100 supporting PTT communications. The architecture includes the deployment of a single PTT server region in conjunction with a carrier's CDMA infrastructure and packet data network. Each region of the PTT servers is deployed over a specific portion of a carrier packet data network. The PTT server within the region may be routing traffic between one or more Packet Data Service Nodes (PDSNs) in the carrier network. A communication device 102 that supports the PTT feature is in communication with a base station (BS) 104. Each BS 104 may be in communication with one or more base station transceivers (BTS) 114. The base station 104 is in communication with a high speed network 106 and PTT communications received from the communication device 102 is sent through the base station 104 and the network 106 to a packet data service node (PDSN). The PDSN communicates with the high speed network 106 and a PTT server's network 108, which is connected to a PTT network 110. The PDSN forwards the PTT communications to a PTT server 112 in the PTT network 110.

The PTT server 112 handles PTT communications among members of a PTT group. The PTT server 112 receives a PTT communication from one member and forwards it to all members of the PTT group. The PTT communication is usually received as data packets from the network 110, and the PTT communication sent out by the PTT server 112 is also in data packet format. A packet data service node (PDSN) and a connected base station (BS) 104 then established through a BTS 114 a dedicated traffic channel to transmit the PTT communication to a receiving mobile client (a PTT member) 102.

Figure 2:
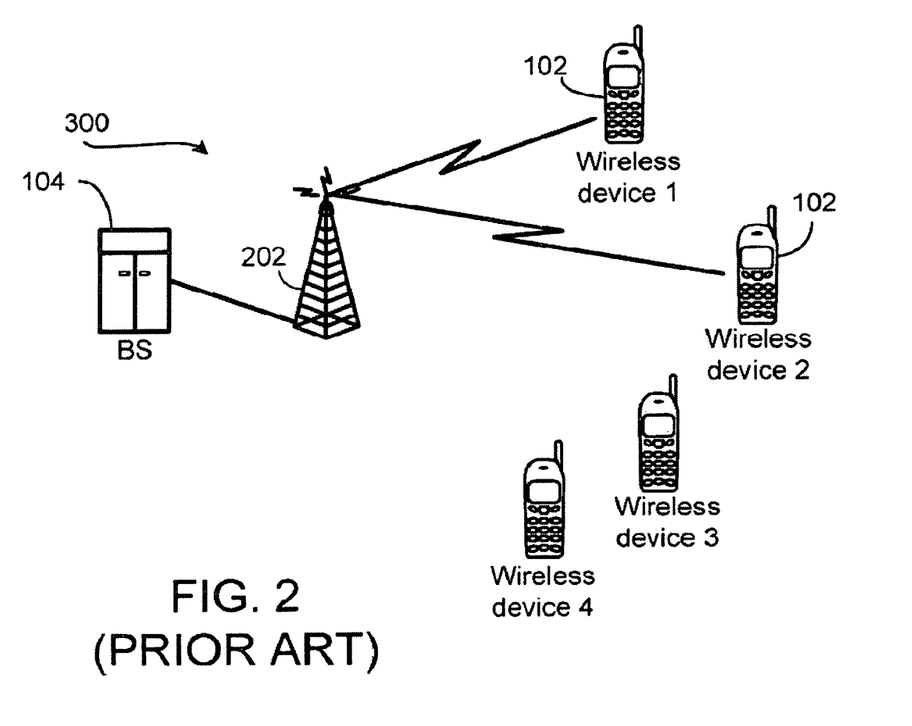
FIG. 2 is a prior art base station supporting a PTT call to multiple wireless communication devices.

FIG. 2 illustrates a communication tower 202 connected to a BS 104 and transmitting radio signals in its coverage area where several wireless devices 102 are located. The BS 104 transmitting a PTT call destined for two wireless devices 102. When a user initiates a PTT call destined to members of a PTT group, the PTT server 112 determines the location of each member and forwards the PTT call to each member. When two receiving members of a PTT call are served by a single BS 104, the BS 104 establishes one communication channel to each wireless device. If there is another incoming PTT communication to members of another PTT group in the same cell, the BS 104 needs to allocate resources and establishes additional traffic channels to each of other receiving PTT members.

Allocating resources for each PTT communication and establishing a traffic channel to support each PTT communication are important part of the PTT communication system. It is desirous to have the PTT communication system that can easily and efficiently manage the resources to support multiple PTT calls.

SUMMARY OF THE INVENTION

The apparatus and method described herein enables multiple multicast communications through virtual multicast channels over a wireless communication network. In one embodiment, there is provided a method for transmitting multiple multicast communications over a wireless communication network. The method includes allocating at a base station a plurality of transmission slots for multicast communications according to a predefined algorithm, receiving at the base station a plurality of multicast communications from a server, assigning a predetermined number of transmission slots for each multicast communication according to the predetermined algorithm, and transmitting each multicast communication to a plurality of wireless devices over the predetermined number of transmission slots within the multicast channel.

In another embodiment, there is provided an apparatus for transmitting multiple multicast communications on a single multicast channel over a wireless communication network. The apparatus includes a network interface unit for receiving multicast communications from a server, a radio interface unit capable of establishing multicast communications to a plurality of wireless communication devices, and a controller. Each multicast communication is broadcasted through a plurality of transmission slots, and the controller unit is capable of assigning a predetermined number of transmission slots to each multicast communication according to a predefined algorithm.

Other advantages and features of the present invention will become apparent after review of the hereinafter set forth Brief Description of the Drawings, Detailed Description of the Invention, and the Claims.

DETAIL DESCRIPTION OF THE INVENTION

In this description, the terms "communication device," "wireless device," "wireless communications device," "PTT communication device," "handheld device," "mobile device," "mobile client," "end-user device," and "handset" are used interchangeably. The terms "call" and "communication" are also used interchangeably, as are the terms "base station" and "base station server." The term "application" as used herein is intended to encompass executable and nonexecutable software files, raw data, aggregated data, patches, and other code segments. The term "exemplary" means that the disclosed element or embodiment is only an example, and does not indicate any preference of user. Further, like numerals refer to like elements throughout the several views, and the articles "a" and "the" includes plural references, unless otherwise specified in the description.

In overview, the system and method enables an efficient and flexible bandwidth usage for multicast communications. The multicast communications are supported by Broadcast Multicast Services (BCMCS). The BCMCS allows optimized use of a broadband wireless network for delivery of BCMCS content streams to one or more terminals in one or more regions of an operator's network. Complementing unicast, which sends video content to subscribers individually (e.g., video-on-demand), BCMCS provides multimedia content transmission from a single source to multiple users simultaneously. Unlike unicast, which is a one-to-one transmission of multimedia data, BCMCS makes efficient use of the air interface and network resources by pushing multimedia content to all terminals in a sector in a single virtual transmission, reducing the cost of delivering content. Service providers do not have to dedicate an entire carrier to multicast. With BCMCS, unicast and multicast can co-exist, enabling service providers to multicast when events or programming mandate (e.g., live sporting events) and then use the carrier for unicast services during periods of inactivity. During multicast, the same multimedia content is sent to users located in multiple sectors.

BCMCS can support PTT communications. PTT communications are generally audio communications; however, data and video may also be broadcasted during PTT communications. To better support PTT multicast communication, the BS 104 may reserve slots used for PTT multicast communication and the PTT server 112 is provisioned with a PTT multicast channel number. When a user powers up his wireless device 102, the wireless device 102 exchanges messages with a BS 104 and the wireless device 102 is registered with the BS 104 and a PTT server 112. After the wireless device is powered up, the wireless device monitors overhead messages broadcast by the BS 104. An overhead message includes information about the multicast channels such as slots, data rate, channel number, etc. For a multicast enabled wireless device, the PTT server 112 sends the PTT multicast channel number to the wireless device 102. By listening to the overhead message from the BS 104, the wireless device 102 learns about the slots, data rate, channel number, etc. used for the PTT multicast channel. When a PTT user (originator) is ready to make a PTT communication, the PTT activation button is pressed on the wireless device 102 and a PTT request is thus made. In response to the PTT request on the wireless device 102, the originating wireless device 102 sends a call request to the PTT server 112. This call request is also known as the PTT dispatcher. The PTT server 112 receives the call request and processes the call request. The call request processing includes identifying the PTT user, identifying a PTT group to which the PTT user belongs, identifying members of this PTT group, and preparing an announce call message to be sent to each member of the PTT group.

After the PTT server 112 sends the announce call messages, each announce call message is received by a PDSN and forwarded by the PDSN to a BS 104. The BS 104 broadcasts the announce call message to the targeted receivers 102. If a mobile client who is a targeted receiver 102 is available, the mobile client 102 sends an accept call message back to the PTT server 112. After receiving the accept call message from at least one mobile client 102, the PTT server 112 sends a floor grant message back to the originating mobile client 102. There may be more than one targeted user 102 in the originator's PTT communication group, and the PTT server 112 grants the floor to the originator if there is at least one targeted mobile client 102 available. After receiving the floor grant message, the PTT requesting mobile client (originating wireless device) 102 can then make a PTT communication.

Figure 3:
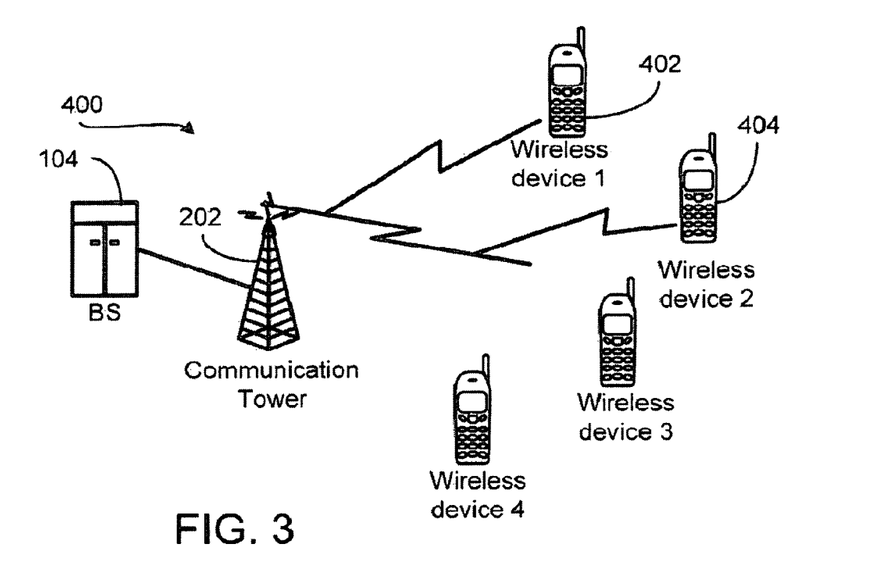
FIG. 3 illustrates an embodiment of a base station supporting a multicast PTT call to multiple wireless communication devices.

FIG. 3 is an illustration of a BS 104 supporting a multicast communication to two wireless devices, 402, 404. When a member of a PTT group uses his wireless device 102 to make a PTT call to other members of his PTT group, the PTT server 112 receives the PTT communication and determines that two members are located in the same geographical area and served by the same BS 104. The PTT server 112 determines that a multicast call may be used to transmit the PTT call to those two recipients 402, 404. The multicast call may then be transmitted over a multicast channel. The multicast channel is commonly used when there is more than one recipient in a particular geographical area. So, instead of establishing multiple unicast calls, with one to each recipient, at least one multicast call can be established by establishing a service of slots in the communication link, the BS 104 allocates one set of time slots (also known as transmission slots) from the PTT multicast channel for the PTT call, and both targeted wireless devices 402, 404 tune in to the PTT multicast channel. A wireless device 402, 404, which must also be a multicast enabled device, generally needs to monitor all the slots in the PTT multicast channel after receiving the announce message. Typically the wireless device 402, 404 discards all the packets not belonging to a call that is directed to this wireless device. For example, the wireless device 402, 404 may identify the packets through the multicast IP address and port number embedded in each packet. The wireless device 402, 404 may learn the multicast IP address and port used for the call from the announce message or any other message from the PTT server 112.

Figure 4:
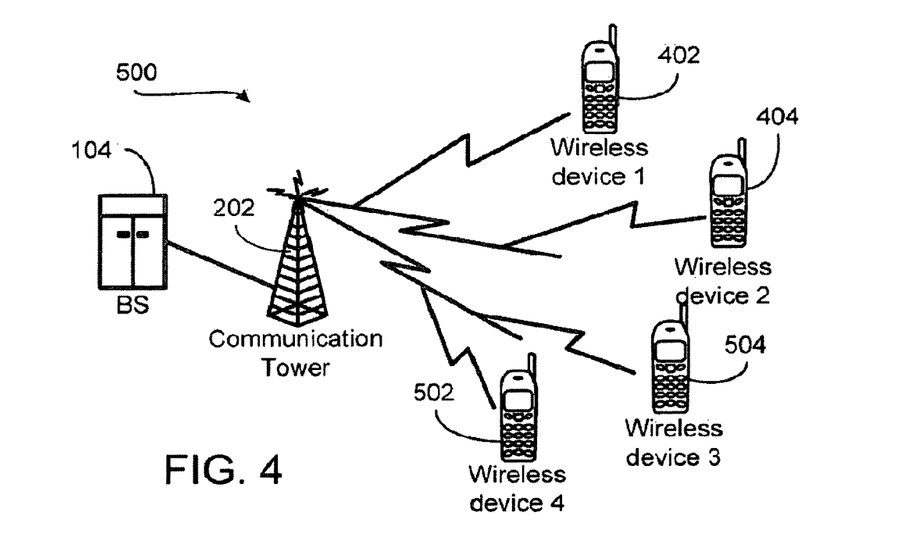
FIG. 4 illustrates a base station supporting multiple multicast PTT calls to multiple wireless communication devices.

FIG. 4 illustrates a BS 104 supporting two PTT calls broadcasted to members of two different PTT groups. If a user belonging to a first PTT group makes a PTT group call to members of a second group, the first PTT group user requests and receives a floor grant from the PTT server 112 and sends the PTT message just like the originating user. The PTT server 112 receives the PTT message and identifies the PTT members for the second group. The PTT server 112 determines that another multicast call may be used and sends multicast call related information to the BS 104 along with the information about the targeted PTT members 502, 504. The BS 104 sends a notification through the control channel to the targeted PTT members 502, 504, and then starts to transmit the PTT communication by allocating slots from the PTT multicast channel allocated for this second multicast call. The wireless device 502, 504 will then monitor the PTT multicast channel for the PTT communication.

Figure 5:
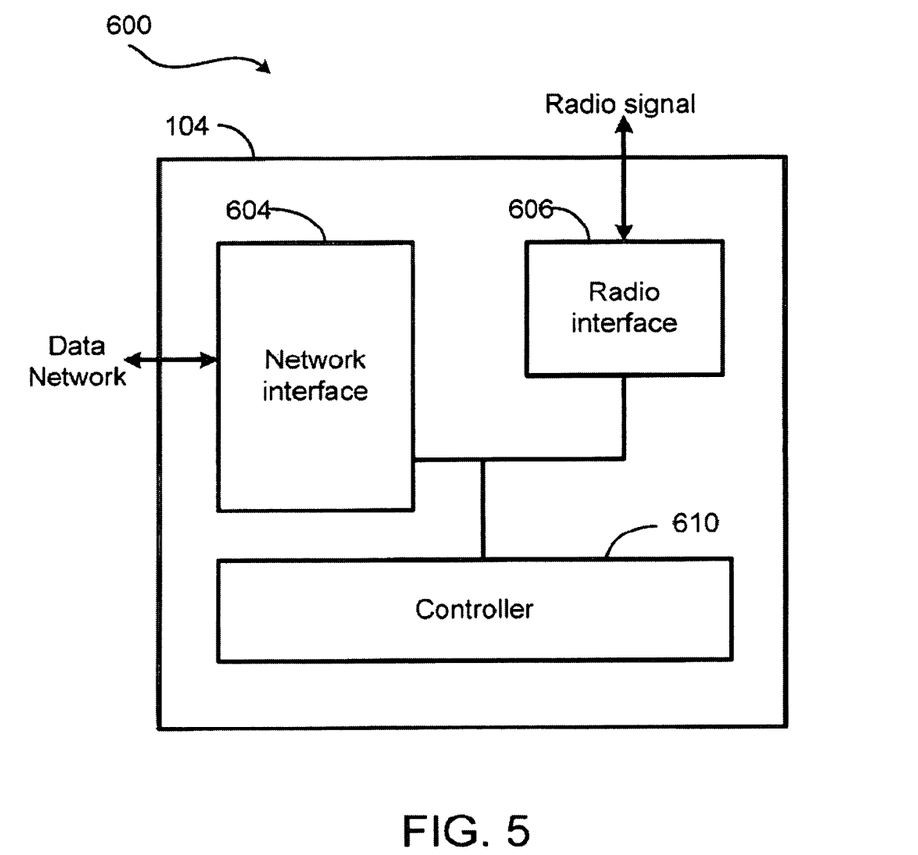
FIG. 5 is a block diagram for a base station supporting the present invention.

FIG. 5 illustrates a block diagram 600 of a BS 104. The BS 104 receives through a network interface 604 information related to audio and data calls from a PTT server 112 and transmits the received information as radio signals through a radio interface 606 to wireless communication devices. The BS 104 also receives communications from the wireless communication devices and transmits them to a remote server. The transmission of communications to the wireless communication devices is through radio signals, and the radio signals are transmitted in multiple time slots. These time slots are resources that a controller 610 in the BS 104 assigns to each communication.

Since a wireless communication device generally listens to all the slots in the PTT multicast channel (the wireless communication device may filter out all the packets does not belong to its call, for example based on multicast IP address and port), the BS 104 could dynamically allocate slots according to the arrival time of the media packets to ensure minimum delay. Additionally, the BS 104 might dynamically adjust the bandwidth for this call based on the BS 104 load.

The BS 104 has a finite number of resources (time slots) that can be assigned to all the communications, including PTT calls, normal wireless telephone calls, data communications, etc. One way to efficiently use these resources is to allocate a predetermined number of slots for handling of multicast communications. For example, if N time slots are needed for handling of one multicast communication, the controller 610 may allocate 10×N for handling the multicast communications. When there is no multicast communication, the controller 610 can use these time slots for handling of other type of communications. When a multicast communication arrives, then N time slots are assigned to this multicast communication. When a second multicast communication arrives, then a second set of N time slots are assigned to this second multicast communication, and so on and so forth. For example, when an eleventh multicast communication arrives, and the controller 610 has no more pre-allocated time slots, then the controller 610 may reject this eleventh multicast communication or may allocate additional time slots, if they are available, from its general resource pool. This scheme ensures that each multicast communication has a constant quality. An advantage provided by the invention is that delay for transmitting media packets is reduced because the BS 104 is able to allocate slots based on the arrival time of the media packet.

Another way to efficiently handle the resources is to allocate a predetermined number of slots and then use them among all multicast communications. For example, if 10×N time slots are assigned for handling multicast communications and there is only one multicast communication, then all 10×N time slots are used for handling this multicast communication. If a second multicast communication arrives, then the controller 610 divides the 10×N time slots among these two multicast communications, each having 5×N time slots. If a third multicast communication arrives, the controller 610 assigns 3.3×N slots to each multicast communication. The server continues to split the resources among all the multicast calls until the resource assigned to each multicast call reaches a predefined minimum, and then the server rejects additional multicast calls. This scheme ensures all incoming multicast communications are handled, but the performance is best when there are fewer simultaneous multicast communications.

Other methods, such as a combination of the algorithms described above, can also be used. For example, upon paying an additional fee, a PTT group may gain a special status and assigned a higher priority than other PTT groups. When a PTT communication from this high priority PTT group is received, the controller 610 assigns a predefined number of time slots, N, to this PTT communication. If two PTT communications from regular PTT groups are then received, the controller divides the remaining time slots between these two regular PTT groups, each receiving (total slots−N)/2 time slots, without affecting the high priority PTT group. If another PTT communication from a second PTT high priority group is received while all three PTT communications are still on going, the controller 610 assigns another predefined number of time slots, N, to this second high priority PTT communication. Therefore each of the two regular PTT communication will be assigned (total slots−2N)/2 time slots. If still later a third PTT communication from a regular client arrives, the controller 610 will reassign the resources, such that each high priority PTT communication receives N time slots, and each regular PTT communication receives (total slots−2N)/3 time slots. This algorithm ensures a stable quality for high paying clients, while still providing a service for regular clients.

Figure 6:
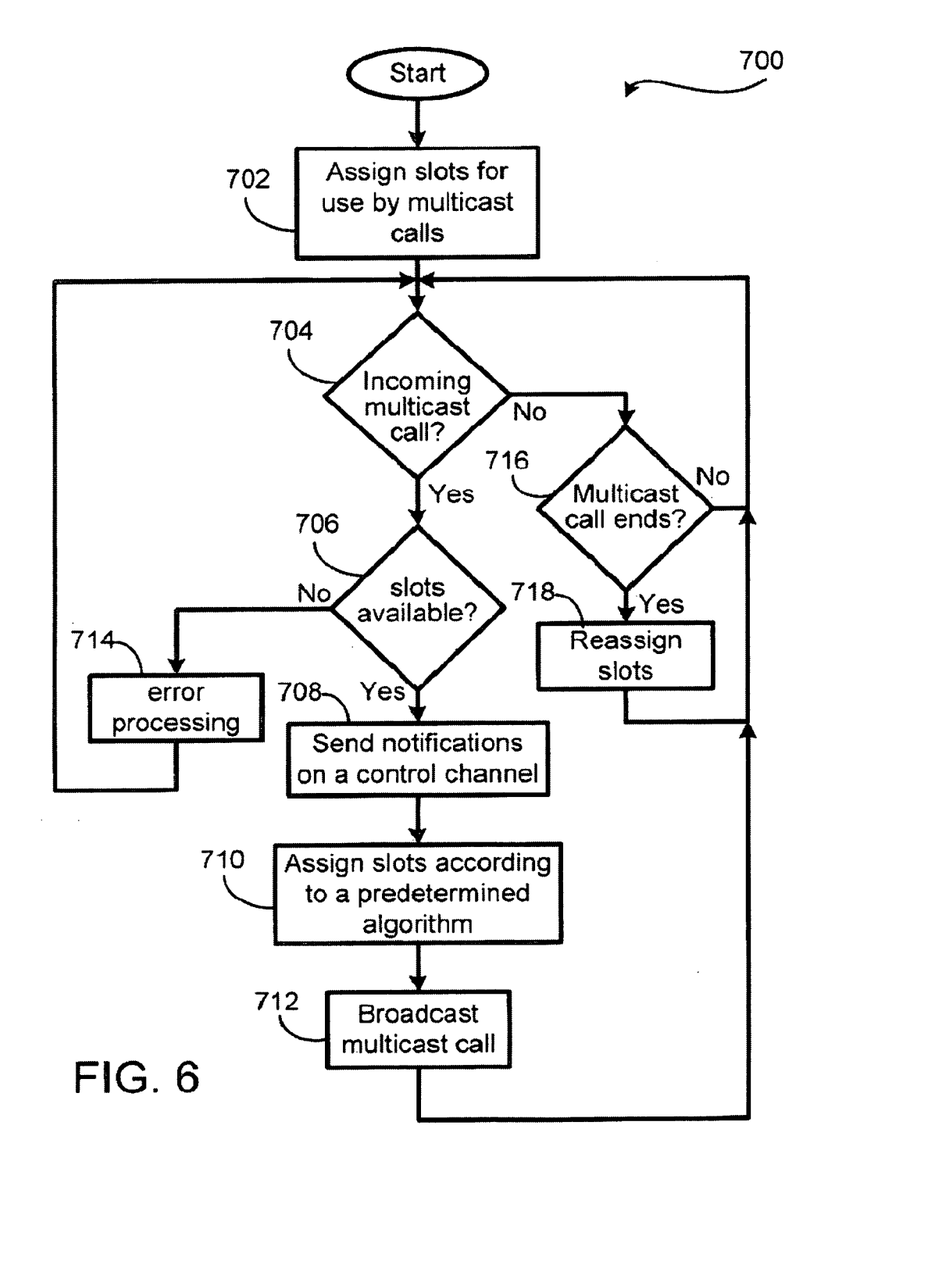
FIG. 6 is a flow chart for a base station process according to the invention.

FIG. 6 illustrates a flow chart for a process 700 that may be used in a BS 104. In block 702, the BS 104 allocates certain number of slots for use by multicast communications. These slots may be allocated based upon the algorithms presented previously. At block 704, the BS 104 checks for any incoming multicast calls. If there are no incoming multicast calls, then the process 700 proceeds along the NO branch to block 716, where the BS 104 checks if a multicast communication had just ended. If no multicast communication had ended, the process 700 proceeds along the NO branch back to 704 where the BS 104 simply continues to monitor for incoming multicast communication. However, if a multicast communication had ended, the process 700 proceeds along the YES branch to block 718, where the BS 104 reassigns the time slots to either a new incoming multicast communication or a general resource pool. The process 700 then proceeds to back to block 704 where the BS 104 continues to monitor for incoming multicast communication.

Returning to block 704, if there is an incoming multicast call, the process 700 proceeds along the YES branch to block 706, where the BS 104 checks if there are any available slots. If there are no available slots for the incoming multicast call, the process 700 proceeds along the NO branch to block 714, where the BS 104 starts an error processing routine, which may involve transmitting a message back to a server. However, if there are available slots, the process 700 proceeds along the YES branch to block 708. In block 708, the BS 104 sends notifications to the targeted wireless devices. The targeted wireless devices receive the notification and tune in to an appropriate multicast channel. At block 710, the BS 104 assigns a certain number of time slots to a multicast channel according to a predefined algorithm. Any one or combination of the algorithms discussed above may be used. At block 712, the BS 104 broadcasts the multicast communication on an appropriate multicast channel. The process 700 then proceeds to monitor for more incoming multicast communications.

In operation, when a user, John, wants to use his wireless device equipped with a PTT feature to communicate with his crew, John activates his wireless device. The wireless device sends a floor request to a PTT server 112. The PTT server 112 receives the request, verifies that no other user has the floor, and grants the floor to John. The grant message is received by John's wireless device 102 and John can then speak into his wireless device 102. The wireless device transmits John's message to the PTT server 112. The PTT server 112 receives the PTT message from John, and identifies members of his PTT group. The PTT server 112 detects that two targeted receivers 402, 404 are served by one single BS 104 and then transmits the PTT message to the BS 104 with an instruction for a multicast call.

The BS 104 has set aside certain bandwidth (time slots) for handling multicast calls and will assign necessary bandwidth to each incoming multicast call. After receiving the PTT message from the PTT server 112, the BS 104 verifies it has sufficient bandwidth to handle the new multicast call. After verifying there is enough resource to handle the new multicast call, the BS 104 will notify the targeted receivers 402, 404 about the PTT message and broadcast the PTT message on the PTT multicast channel. The targeted wireless devices 402, 404 will then tune to the PTT multicast channel and receive the PTT message. After broadcasting the PTT message, the BS 104 will reassign the bandwidth for other incoming multicast calls.

Although the current embodiment is described above in a PTT environment, the invention is not limited to PTT communications. In a broader sense, the system and methods optimize bandwidth utilization by a BS 104 supporting multiple multicast communications. In view of the method being executable on a wireless service provider's computer device, the method can be performed by a program resident in a computer readable medium, where the program directs a server or other computer device having a computer platform to perform the steps of the method. The computer readable medium can be the memory of the server, or can be in a connective database. Further, the computer readable medium can be in a secondary storage media that is loadable onto a wireless communications device computer platform, such as a magnetic disk or tape, optical disk, hard disk, flash memory, or other storage media as is known in the art.

In the context of FIGS. 3-6, the current embodiment may be implemented, for example, by operating portion(s) of the wireless network, such as a wireless communications device or the server, to execute a sequence of machine-readable instructions. Though the process is illustrated in sequence, the method may be implemented in a different sequence or as an event driven process. The instructions can reside in various types of signal-bearing or data storage primary, secondary, or tertiary media. The media may comprise, for example, RAM (not shown) accessible by, or residing within, the components of the wireless network. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the current embodiment has been particularly shown and described with reference to a preferred embodiment thereof, it will be understood by those skilled in the art that various changes in form and detail may be made without departing from the spirit and scope of the present invention as set forth in the following claims. For example, the description above is based on an audio PTT communication, it is understood the apparatus, system, and method can be easily modified to support other type of media, such as video, data, etc. Furthermore, although elements of the invention may be described or claimed in the singular, the plural is contemplated unless limitation to the singular is explicitly stated.

What is claimed is:

1. A method for transmitting multiple multicast communications over a wireless communication network, comprising:
   allocating at a base station a plurality of transmission slots for multicast communications according to a multicast slot allocation algorithm, wherein the plurality of transmission slots that are allocated to the multicast communications are reserved slots for the multicast communications;
   receiving at the base station a plurality of multicast communications from a server that are each targeted to a different multicast communication group;
   assigning one or more transmission slots from the plurality of allocated transmission slots to each multicast communication according to a multicast slot assignment algorithm; and
   transmitting each multicast communication to a plurality of wireless devices over its assigned one or more transmission slots within a multicast channel.

2. The method of claim 1, wherein the multicast slot assignment algorithm is a fixed bandwidth scheme.

3. The method of claim 2 wherein the fixed bandwidth scheme assigns a fixed number of transmission slots to each multicast communication.

4. The method of claim 1, wherein the multicast slot assignment algorithm is an adjustable bandwidth scheme.

5. The method of claim 4, wherein the adjustable bandwidth scheme equally divides the plurality of transmission slots among the plurality of multicast communications.

6. The method of claim 1, further comprising transmitting notifications to recipients of each multicast communication over a control channel.

7. The method of claim 1, wherein each multicast communication is a push-to-talk communication.

8. The method of claim 1, further comprising transmitting, for each multicast communication, information about the one or more number of transmission slots to the plurality of wireless devices before the multicast communication is transmitted to the plurality of wireless devices.

9. The method of claim 1, wherein the multicast slot assignment algorithm assigns the one or more transmission slots assigned to each multicast communication are assigned based upon an arrival time of packets in the received multicast communications.

10. The method of claim 1, wherein a number of the reserved slots for the multicast communications does not change based on a number of the plurality of multicast communications that are received from the server.

11. The method of claim 1, wherein the transmitting step transmits on each of the reserved slots irrespective of a number of the plurality of multicast communications from the server, such that, on average, at least one of the plurality of multicast communications from the server is assigned a higher number of slots if the number is lower as compared to if the number is higher.

12. A system for transmitting multiple multicast communications on a single multicast channel over a wireless communication network, comprising:
   a network interface unit configured to receive a plurality of multicast communications from a server that are each targeted to a different multicast communication group;
   a radio interface unit configured to transmit the plurality of multicast communications to a plurality of wireless communication devices on a plurality of transmission slots that are allocated to multicast communication transmissions in accordance with a multicast slot allocation algorithm, wherein the plurality of transmission slots that are allocated to the multicast communications are reserved slots for the multicast communications; and a controller unit configured to assign one or more transmission slots from the plurality of allocated transmission slots to each multicast communication according to a multicast slot assignment algorithm, wherein the radio interface unit is further configured to transmit each of the plurality of multicast communications over its assigned one or more transmission slots within the single multicast channel.

13. The system of claim 12, wherein the multicast slot assignment algorithm is a fixed bandwidth scheme.

14. The system of claim 13, wherein the fixed bandwidth scheme assigns a fixed number of transmission slots to each multicast communication.

15. The system of claim 12, wherein the multicast slot assignment algorithm is an adjustable bandwidth scheme.

16. The system of claim 15, wherein the adjustable bandwidth scheme equally divides the plurality of transmission slots among the plurality of multicast communications.

17. The system of claim 12, wherein the radio interface is further configured to transmit notifications to the plurality of wireless communication devices of each multicast communication over a control channel.

18. The system of claim 12, wherein each multicast communication is a push-to-talk communication.

19. An apparatus for transmitting multiple multicast communications on a single multicast channel over a wireless communication network, comprising:

means for receiving a plurality of multicast communications from a server that are each targeted to a different multicast communication group;

means of transmitting the plurality of multicast communications to a plurality of wireless communication devices through a plurality of transmission slots that are allocated to multicast communication transmissions in accordance with a multicast slot allocation algorithm, wherein the plurality of transmission slots that are allocated to the multicast communications are reserved slots for the multicast communications; and means for assigning one or more transmission slots from the plurality of allocated transmission slots to each multicast communication according to a multicast slot assignment algorithm.

20. The apparatus of claim 19, wherein the multicast slot assignment algorithm is a fixed bandwidth scheme.

21. The apparatus of claim 20, wherein the fixed bandwidth scheme assigns a fixed number of transmission slots to each multicast communication.

22. The apparatus of claim 19, wherein the multicast slot assignment algorithm is an adjustable bandwidth scheme.

23. The apparatus of claim 22, wherein the adjustable bandwidth scheme equally divides the plurality of transmission slots among the plurality of multicast communications.

24. The apparatus of claim 19, wherein the means for transmitting is further configured to transmit notifications to the plurality of wireless communication devices of each multicast communication over a control channel.

25. The apparatus of claim 19, wherein the plurality of multicast communications are part of push-to-talk communications.

26. A non-transitory computer-readable medium comprising at least one instruction, which, when executed by a machine, causes the machine to perform operations, the instructions comprising:

a set of instructions to allocate at a base station a plurality of transmission slots for multicast communications according to a multicast slot allocation algorithm, wherein the plurality of transmission slots that are allocated to the multicast communications are reserved slots for the multicast communications;

a set of instructions to receive at the base station a plurality of multicast communications from a server that are each targeted to a different multicast communication group;

a set of instructions to assign one or more transmission slots from the plurality of allocated transmission slots to each multicast communication according to a multicast slot assignment algorithm; and a set of instructions to transmit each multicast communication to a plurality of wireless devices over its assigned one or more transmission slots within a multicast channel.

27. The non-transitory computer-readable medium of claim 26, wherein the multicast slot assignment algorithm is a fixed bandwidth scheme.

28. The non-transitory computer-readable medium of claim 27, wherein the fixed bandwidth scheme assigns a fixed number of transmission slots to each multicast communication.

29. The non-transitory computer-readable medium of claim 26, wherein the multicast slot assignment algorithm is an adjustable bandwidth scheme.

30. The non-transitory computer-readable medium of claim 29 wherein the adjustable bandwidth scheme equally divides the plurality of transmission slots among the plurality of multicast communications.

31. The non-transitory computer-readable medium of claim 26, further comprising a set of instructions to transmit notifications to the plurality of wireless communication devices of each multicast communication over a control channel.

32. The non-transitory computer-readable medium of claim 26, wherein each multicast communication is a push-to-talk communication.

33. A method of operating an access network, comprising:

reserving a block of slots on a transmission channel to be dedicated to multicast communication session traffic carried in a given cell of the access network;

obtaining a plurality of multicast streams for transmission to a plurality of different multicast groups;

distributing slots from the reserved block of slots to each of the plurality of multicast streams based on a multicast slot assignment algorithm; and transmitting the plurality of multicast streams to two or more target wireless communication devices in each of the plurality of different multicast groups on the transmission channel within the given cell based on the slot distribution.

34. An access network, comprising:

means for reserving a block of slots on a transmission channel to be dedicated to multicast communication session traffic carried in a given cell of the access network;

means for obtaining a plurality of multicast streams for transmission to a plurality of different multicast groups;

means for distributing slots from the reserved block of slots to each of the plurality of multicast streams based on a multicast slot assignment algorithm; and means for transmitting the plurality of multicast streams to two or more target wireless communication devices in each of the plurality of different multicast groups on the transmission channel within the given cell based on the slot distribution.

35. An access network, comprising:

a controller unit configured to reserve a block of slots on a transmission channel to be dedicated to multicast communication session traffic carried in a given cell of the access network;

a network interface unit configured to obtain a plurality of multicast streams for transmission to a plurality of different multicast groups;

wherein the controller unit is configured to distribute slots from the reserved block of slots to each of the plurality of multicast streams based on a multicast slot assignment algorithm; and a radio interface unit configured to transmit the plurality of multicast streams to two or more target wireless communication devices in each of the plurality of different multicast groups on the transmission channel within the given cell based on the slot distribution.

36. A non-transitory computer-readable medium comprising at least one instruction, which, when executed by a machine, causes the machine to perform operations, the instructions comprising:

a set of instructions to reserve a block of slots on a transmission channel to be dedicated to multicast communication session traffic carried in a given cell of the access network;

a set of instructions to obtain a plurality of multicast streams for transmission to a plurality of different multicast groups;

a set of instructions to distribute slots from the reserved block of slots to each of the plurality of multicast streams based on a multicast slot assignment algorithm; and a set of instructions to transmit the plurality of multicast streams to two or more target wireless communication devices in each of the plurality of different multicast groups on the transmission channel within the given cell based on the slot distribution.

* * * * *